United States Patent [19]

Bouchard et al.

[11] Patent Number: 4,783,657

[45] Date of Patent: Nov. 8, 1988

[54] PROCESSOR INTERCOMMUNICATION NETWORK

[75] Inventors: Stanley F. Bouchard, Wappingers Falls; Paul R. Heintz, Poughkeepsie, both of N.Y.; Paul H. Tracy, North Plainfield, N.J.

[73] Assignee: International Business Machines Corporation, Armonk, N.Y.

[21] Appl. No.: 828,103

[22] Filed: Feb. 10, 1986

[51] Int. Cl.$^4$ .................. H04Q 9/00; H04Q 11/00
[52] U.S. Cl. .................. 340/825.520; 340/825.030; 370/58
[58] Field of Search .............. 340/825.52, 826, 825.02, 340/827, 825.03; 370/58, 67, 92, 64, 85, 88

[56] References Cited

U.S. PATENT DOCUMENTS

| | | | |
|---|---|---|---|
| 3,309,467 | 3/1967 | Gorgas et al. | 340/827 |
| 3,778,780 | 12/1973 | Moore | 364/200 |
| 3,787,891 | 1/1974 | Moore et al. | 364/200 |
| 4,434,463 | 2/1984 | Quinquis et al. | 340/825.02 |
| 4,597,075 | 6/1986 | Israel | 370/58 |

FOREIGN PATENT DOCUMENTS

2125254 2/1984 United Kingdom ............... 370/64

Primary Examiner—Donald J. Yusko
Attorney, Agent, or Firm—James E. Murray

[57] ABSTRACT

In a processor intercommunication network, every pair of processors is connected by a separate path for carrying multi-bit orders so that in an N processor multiprocessing system there are N−1 bidirectional communication paths to and from each of the N processors. To send an order from one processor to another processor each of the N processors has a routing circuit to select the proper path to that other processor. The routing circuit compares the sender's own address to the address of the intended receiver to select the appropriate sending path. Each of the N processors also has a receiving circuit to block orders from any one of the other processors. In blocking orders, these receiving circuits use the receiver's address to determine which one of the N−1 paths is from that of any one processor.

4 Claims, 8 Drawing Sheets

PROCESSOR INTERCOMMUNICATION NETWORK

The present invention relates to the transmission of signals, or orders, between processors in a multiprocessor system.

In a system such as disclosed in U.S. Pat. Nos. 3,787,891 and 3,778,780, a binary coded order is transmitted from a sending processor to a receiving processor to be acted upon by the receiving processor. When this system is implemented in a multiprocessor configuration containing a large number of processors, each processor must be capable of communicating a multi-bit binary signal or order to itself and to each of the other processors of the multiprocessor.

BRIEF DESCRIPTION

In accordance with the present invention, an improved communication network is provided for transmission of such orders between processors. In this communication network, every pair of processors is connected by a separate path for carrying the multi-bit orders so that in an N processor multiprocessing system there are N−1 bidirectional communication paths to and from each of the N processors. To send an order from one processor to another processor each of the N processors has a routing circuit to select the proper path to that other processor. The routing circuit compares the sender's own address to the address of the intended receiver to select the appropriate path. Each of the N processors also has a receiving circuit to block orders from any one of the other N−1 processors. In blocking orders, these receiving circuits use the receiver's address to determine which one of the N−1 paths into the receiver is from that any one processor.

The logic of the routing and receiving circuits permits the identical circuits to be used in each of the N processors. In addition, it is possible to change the addresses of the N processors without having to change the communication network coupling the processors and the routing and receiving circuits in the processors. Furthermore, the logic of the routing and receiving circuits does not require the addresses of the routing and/or receiving circuit to be transmitted along with the 2-bit order.

Therefore, it is an object of the present invention to provide a network for communicating orders between processors of a multiprocessor system.

It is another object of the invention to provide such a network in which the circuitry for receiving or sending circuits is identical in each of the processors in the system.

It is a further object of the invention to provide a processor interconnection network that does not require the transmission of the address of either sending or receiving unit on the network.

THE DRAWINGS

Theseand other objects can best be understood by reference to the accompanying figures of which.

DETAILED DESCRIPTION

Figure 1:
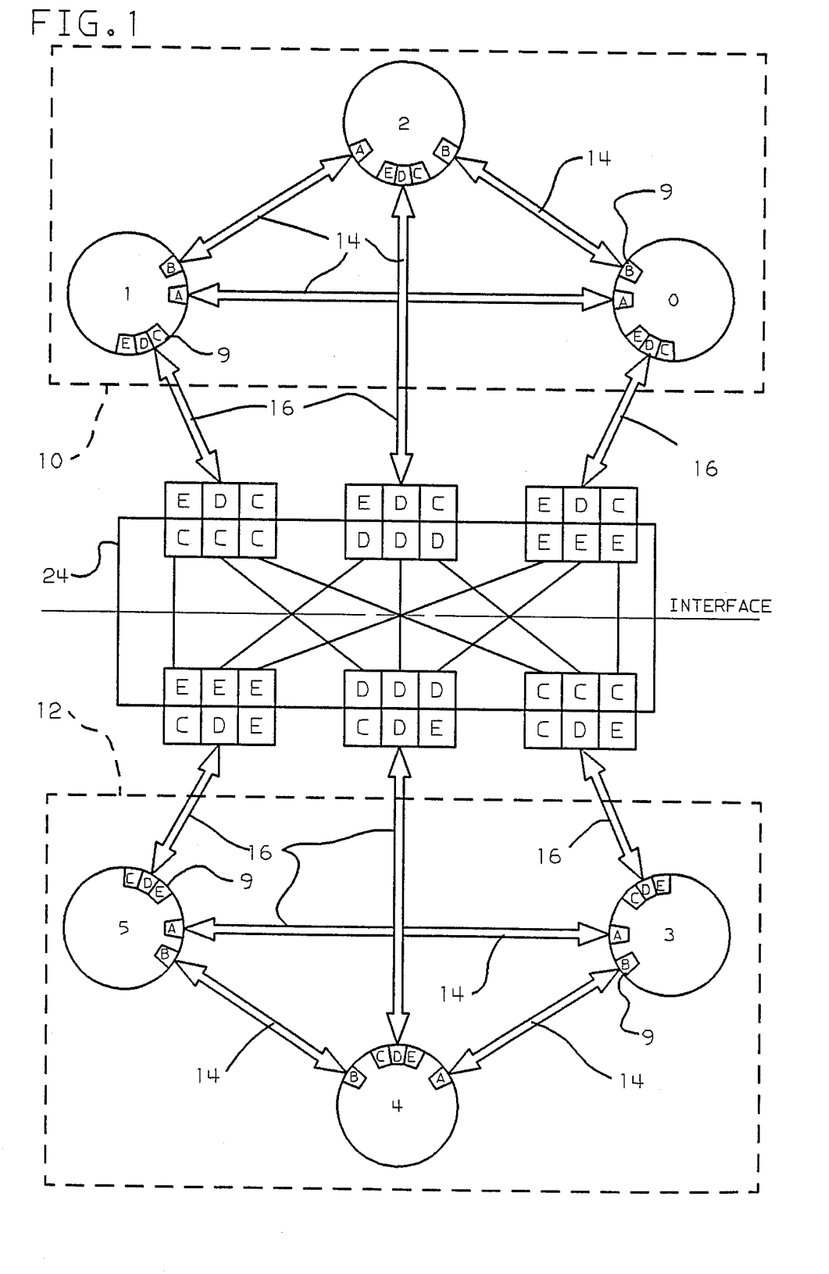
FIG. 1 is a schematic diagram of an interconnection network between the processors of a 6-way multiprocessor system.

FIG. 1 shows a 6-way multiprocessor system in which the six processors 0, 1, 2, 3, 4 and 5 are divided into two groups of three processors each. Any one of the six processors can transmit an order to itself or to any of the other five processors along a separate multi-line path that connects only the sending and receiving processors together. For purposes of this description control processor "0" is assumed to be the transmitting processor. Then, processors 0, 1 and 2 make up the local processor group 10 while processors 3, 4 and 5 make up the remote processor group 12. Each processor has five terminal ports 9 labeled A, B, C, D and E, as part of identical sending and receiving means in each processor for connecting five, four-line communication paths to that processor. Each four-line path is divided into two unidirectional buses of two lines each, for carrying a two-bit encoded order between the two processors linked by that path. The two-bit binary coded order indicates a type of function to be performed by the receiving processor.

Figure 2:
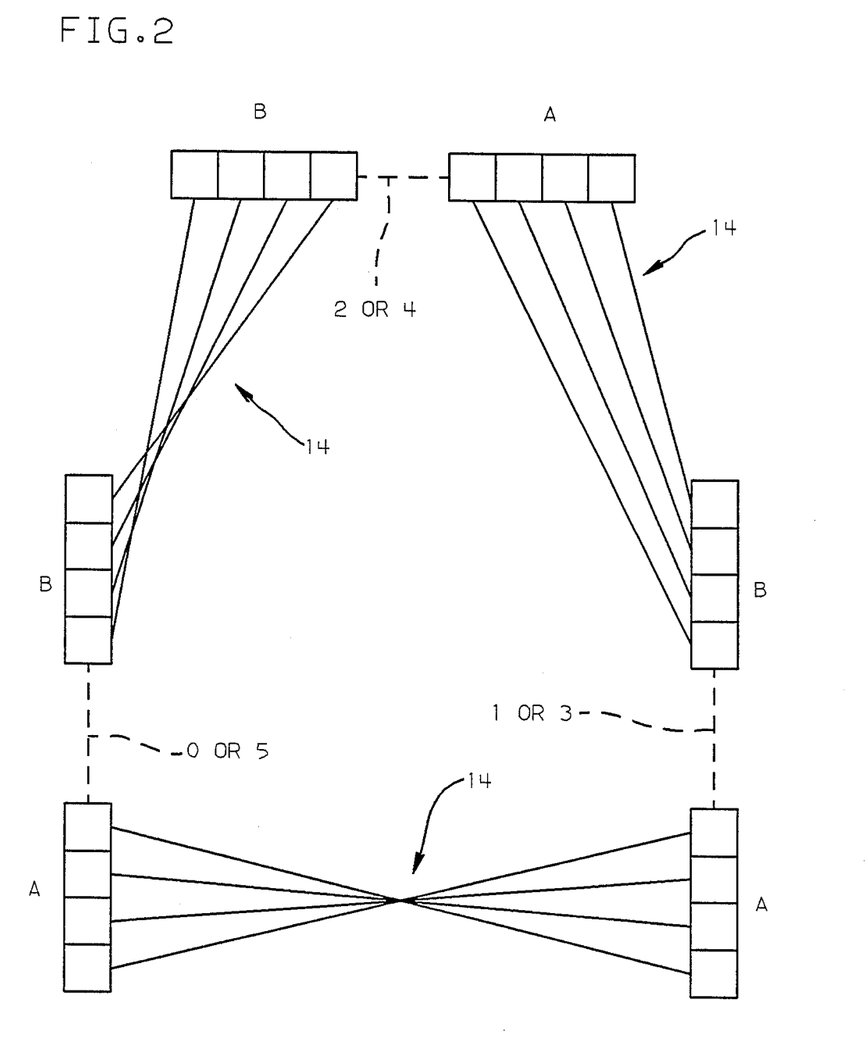
FIG. 2 is a cabling diagram for one of the two groups of three processors in the multiprocessing system of FIG. 1.

As shown in FIG. 2, in each group 10 or 12, each processor interfaces with each of the other two processors in the same group directly through a cable 14 containing one of the four-line paths. These are identical flat cables with two of the cables given a ½ twist to reverse the connections so that like interfacing port connectors in each processor are wired alike instead of as mirror images of each other.

Figure 3:
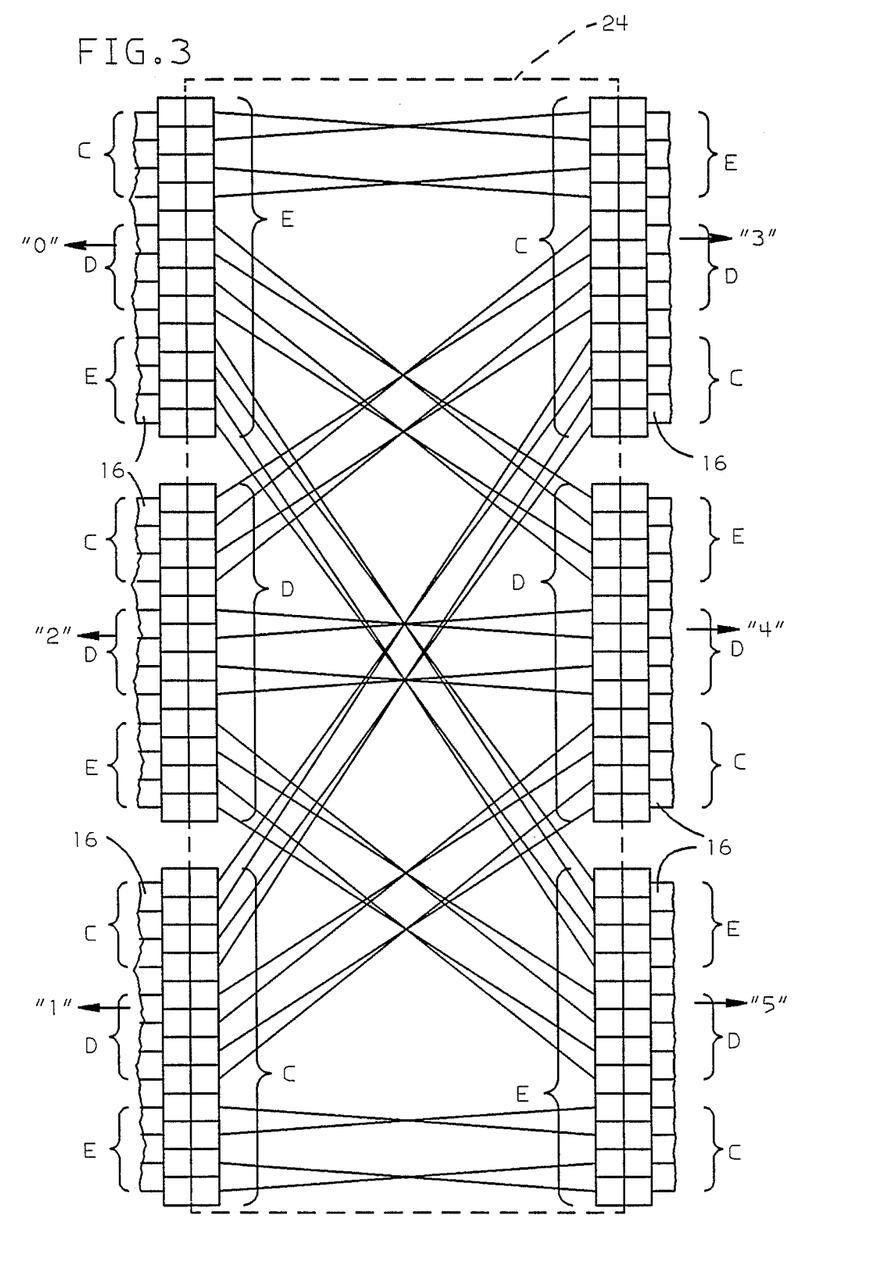
FIG. 3 is a wiring diagram of the interconnection terminal connecting the two groups of three processors in the 6 multiprocessor system of FIG. 1.

Each processor also interfaces the processors in the remote group through twelve wire cables 16, each containing three four-wire paths, one for each of the processors in the remote group. The four-wire paths in cables 16 pass through an interconnection terminal 24 which is schematically illustrated in FIG. 3. The terminal 24 is wired so the connectors in the processors can be wired identically instead of being mirror images of each other.

In each of the processors 0, 1, 2, 3, 4, 5, there is logic circuits for sending and receiving. The sending logic circuit shown in FIGS. 4A and 4B routes the 2-bit binary coded order onto the output unidirectional 2-bit bus of one of the terminal ports A, B, C, D, E for transmission. The receiving circuit of FIGS. 5A and 5B enables the receipt of the 2-bit signal into the processor on the input unidirectional buses connected to the terminal ports A, B, C, D and E.

Figure 6:
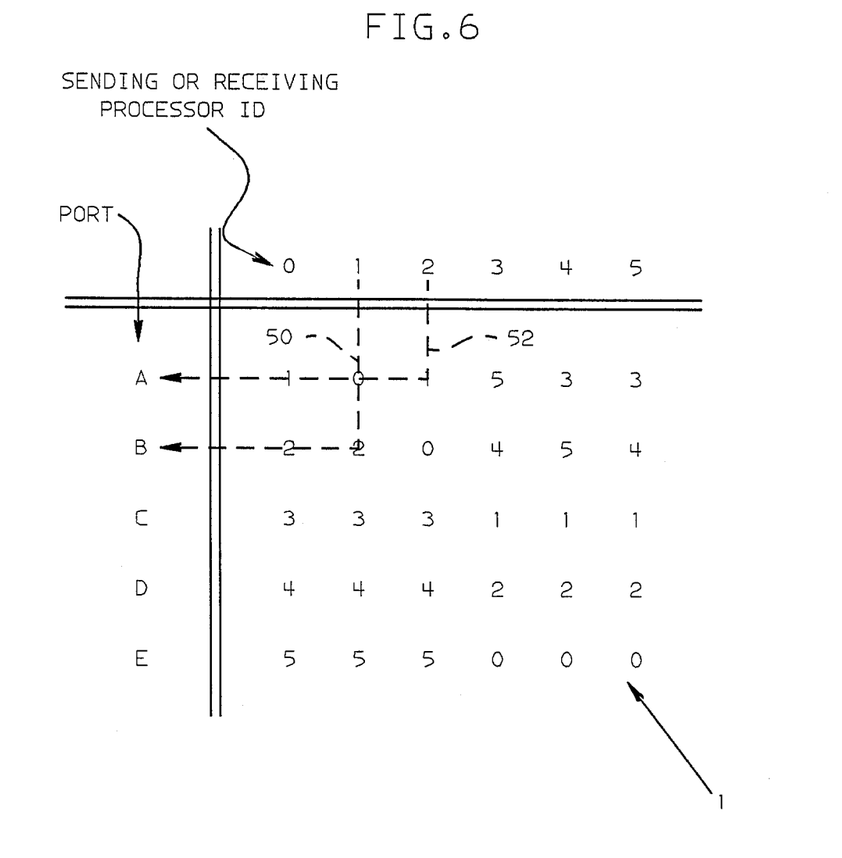
FIG. 6 is a truth table showing the allocation of ports receiving or sending signals to a particular processor.

The gating of the outgoing orders is done on the basis of a 3 binary bit identifier of both the transmitting device and the receiving device. For instance, if processor 0 whose address is 000 is transmitting to device 1 whose address is 001, both IDs affect which terminal (port A) the order is being transmitted out onto. The gating of incoming orders involves the receiving ID (001) which identifies the terminal (port A) the order is received on. The table of FIG. 6 is a truth table which shows the port used in sending or receiving an order. In case of sending an order, the numbers in the top row of the table represent the ID of the sending processor. In the case of receiving an order, the numbers in the top row represent the receiving processor. For instance, if an order is to be sent by processor 1 to processor 2, it is transmitted out of processor 1 on terminal port B as shown by dotted line 50 and received by processor 2 at terminal port A as shown by dotted line 52.

Figure 4A:
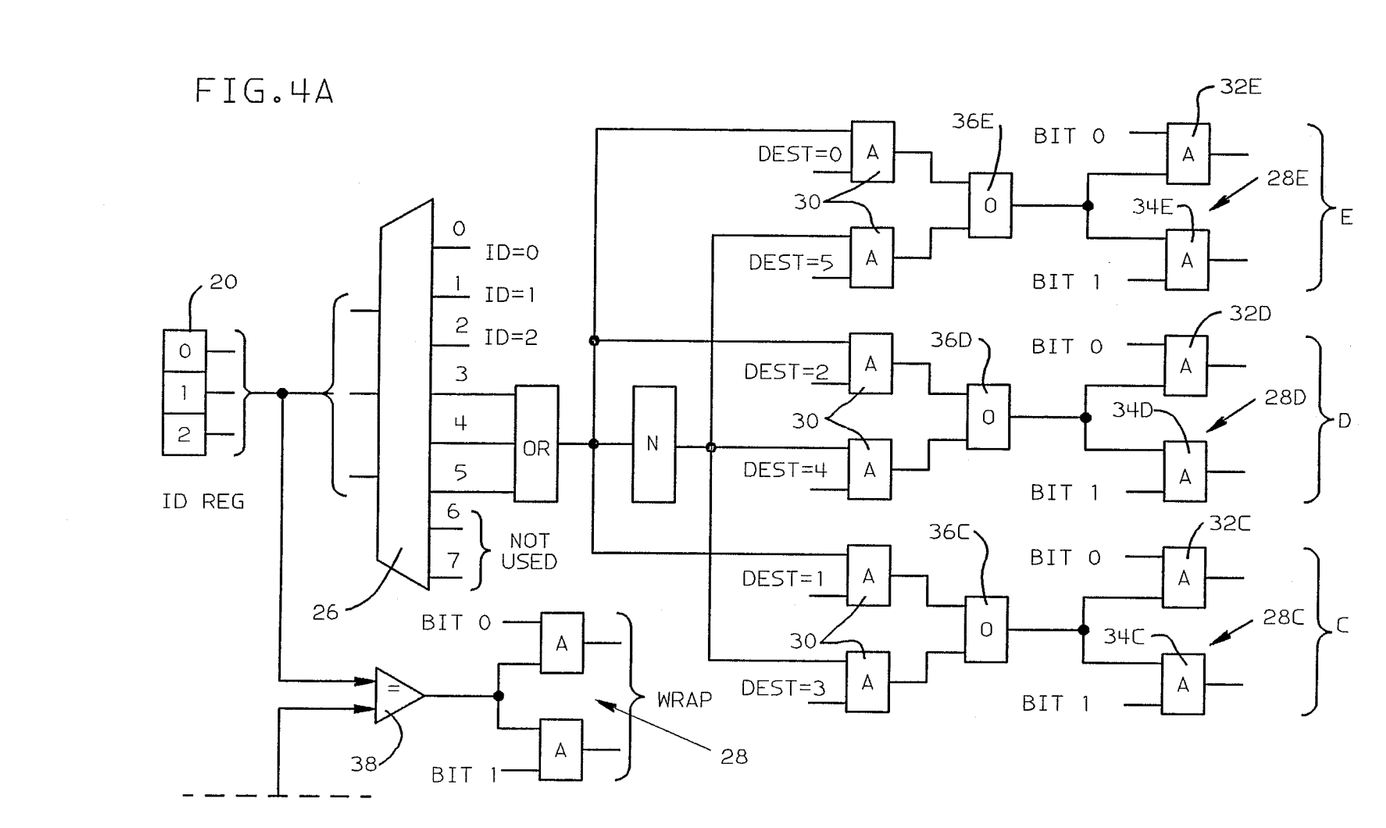
FIGS. 4A and 4B are logic diagrams of logic associated with the identical sending ports in each of the 6 processors in FIG. 1.
Figure 4B:
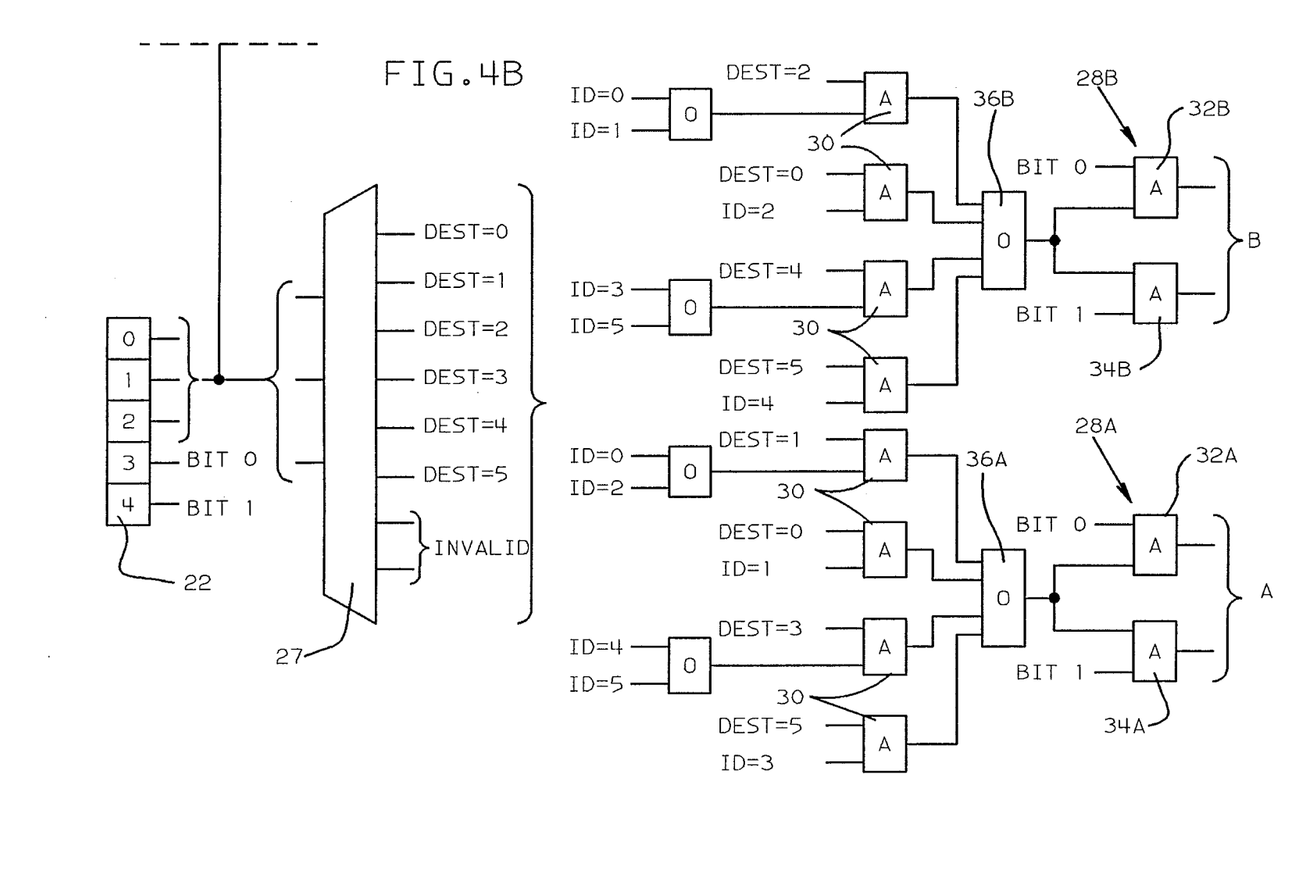

Referring to FIGS. 4A and 4B, the logic circuitry in each processor includes two registers, an ID register 20 which contains the ID or address of the processor containing the logic circuit and a signal processor (SIG-P) register 22 which contains both the ID or address of the processor to which a message is to be sent and the 2-bit encoded message being sent to that processor. The ID's are three bit binary numbers which are the binary equivalents of the decimal number assigned to the processor in FIG. 1. Thus, the ID of processor 0 is 000, the ID of processor 1 is 001 and so on. The order is a 2 bit binary number representing the type of function to be performed by the processor receiving the order.

The 3-bit IDs in both registers 20 and 22 are decoded by decoders 26 and 27 respectively to select one of 8 possible decoder outputs. Two of the outputs (6 and 7) of both the decoders are unused or invalid outputs in this 6-way processor configuration. The outputs of decoders 26 and 27 are fed into AND, OR invert logic that controls gates 36 enabling the access of the message data bits 0 and 1 to the various terminals A, B, C, D and E of the processor. For instance, if an order is to be sent from processor 3 to processor 0 the ID in register 20 would be 011 and the ID in register 22 would be 000 producing an ID=3 signal out of decoder 26 and a DEST=0 signal out of decoder 27. This generates an enabling output from OR gate 36E allowing order bits 0 and 1 to be sent out port E through AND gates 32E and 34E of gate circuit 28E. As can be seen from the truth table in FIG. 6, a signal from terminal port E of processor 3 is transmitted to processor 0.

While gate 28E is enabled by the output of OR gate 36E the other gates 28A–28D are not enabled so that the order is not transmitted to any processor except processor 0. Besides being fed to decoder 26 and 27 the ID data in registers 20 and 22 is fed into address comparator 38. If the IDs are identical, the output of comparator 38 enables gate 28' which feeds the order data bit 0 and bit 1 back into the sending processor, or in other words wraps the data.

Figure 5A:
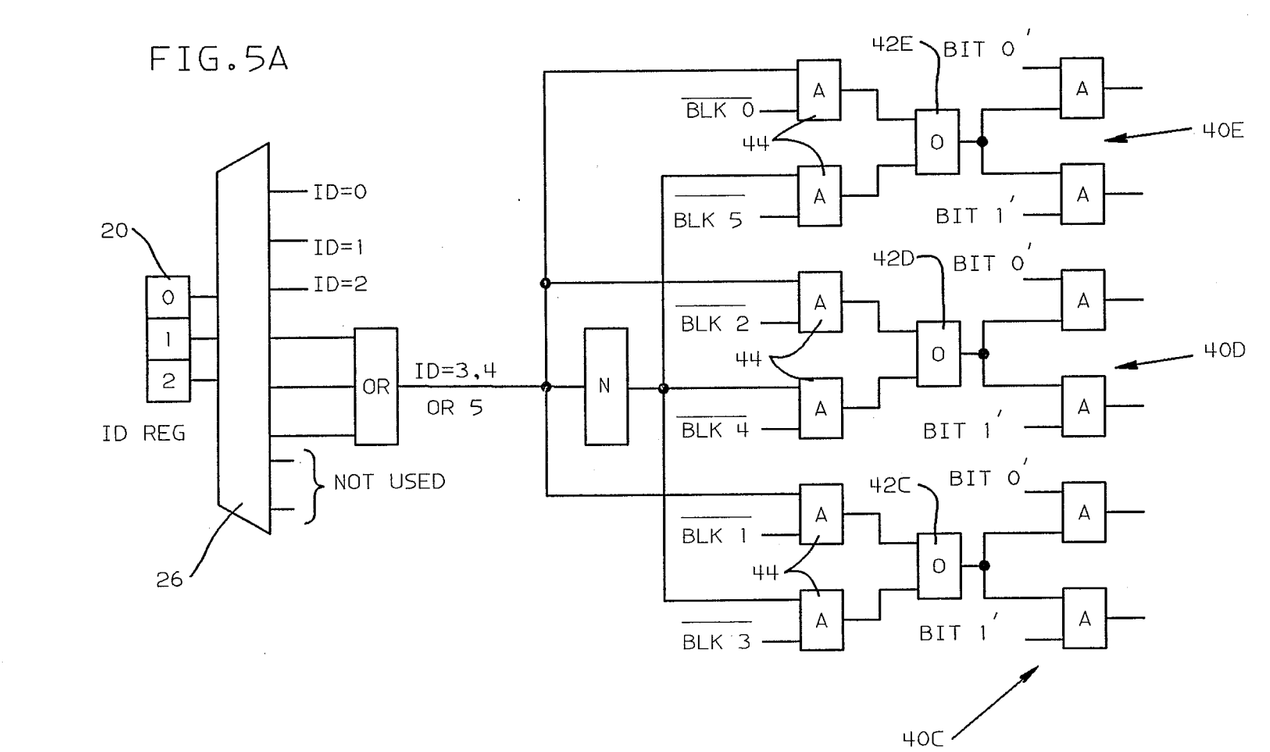
FIGS. 5A and 5B are logic diagrams of the logic associated with the identical receiving ports in each of the processors of FIG. 1.
Figure 5B:
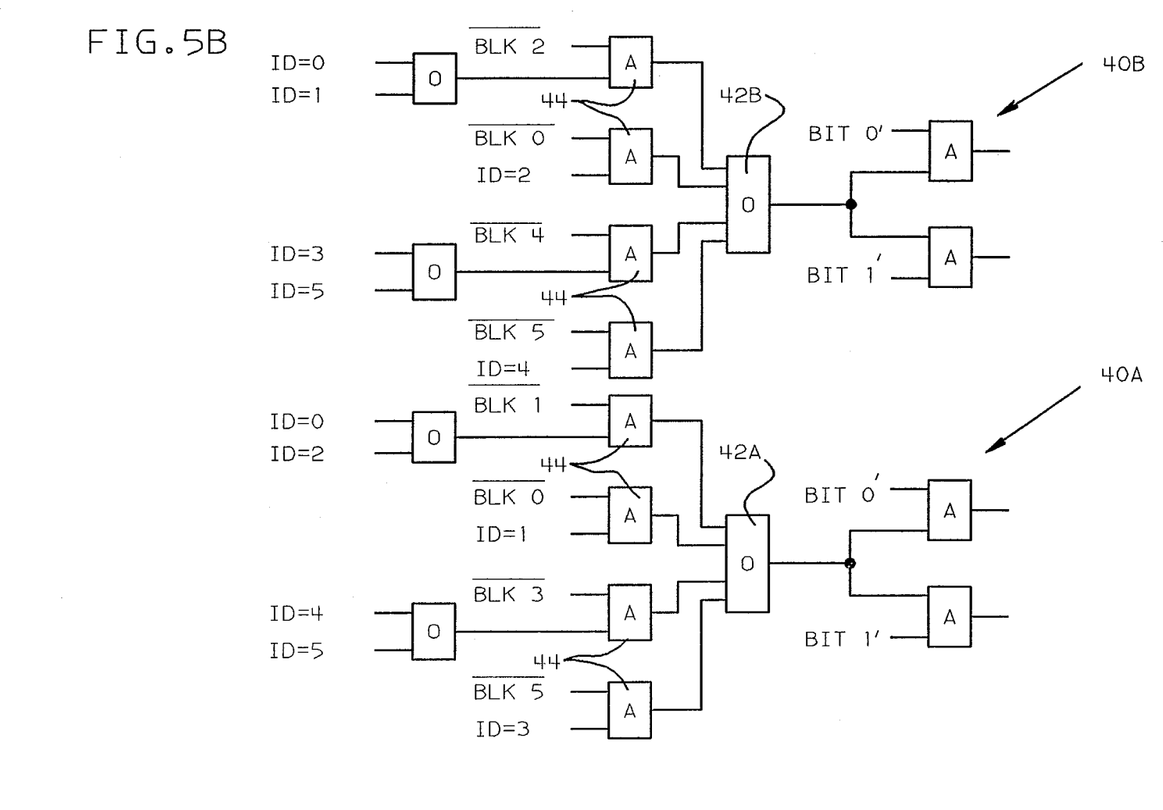

As shown in FIGS. 5A and 5B, gates 40 control the reception of data into the processor. Gates 40 each control the entry of order bits 0' and 1' through one of the ports. Before the order can enter through any gate 40, the gate 40 must receive an enabling output from its associated OR gate 42. In order for this enabling signal to be produced, AND gates have to receive an ID output of the decoder 26 and a not blocked pulse $(\overline{exBlK2})$. Therefore, each processor can selectively block an order from any of the five other processors by dropping the non-blocking pulse for that processor. The processor ID then identifies which port receives signals from that processor. For instance, suppose processor 0 decides it does not want to receive an order from processor 4. Then $\overline{BlK4}$ goes down disabling gate 40D and thereby blocking incoming order bits 0' and 1' from entering on port D. An examination of the table on FIG. 6 shows that order signals from processor 4 are received at port D in processor 0.

One embodiment of the circuit has been described. A number of changes can be made in this embodiment. For instance, six processors need not be employed to have the system operate. Any of the processors can be missing but the system will still function with respect to the remaining processors. Also, while the coding permits eight processors, the system shown here has been developed for only six. Obviously, the invalid output of the decoders 26 and 27 could be used if the system were expanded to include eight processors. Furthermore, by increasing the number of bits in the processor's ID or addresses and appropriately modifying the transmission network, the system could include even more than eight processors.

Therefore, it should be understood to those skilled in the art that many change and modifications can be made without departing from the spirit and scope of the invention as defined in the appended claims.

What we claim as new and desire to secure by Letters Patent is:

1. A communication network for interconnecting N processors in a mutiprocessing system for transmission of binary encoded orders between any two of the N processors comprising:
    a separate multi-line path between each two of the N processors for carrying an order signal in either direction between said each two of the N processors so that there are N−1 paths to and from each of the N processors;
    N identical sending and receiving means, one in each of the N processors, for routing an order through the appropriate path to one of the other N−1 processors, each said sending and receiving means including;
    ID means for receiving an M-digit binary address identifying the processor containing the particular sending and receiving means;
    order means for receiving a G-digit binary coded order for another processor and an M digit binary address of that other processor;
    N−1 terminal means each one connecting the processor containing the sending and receiving means to one of the multi-line paths;
    N−1 gate means, one assoicated with each of the N−1 terminal means, for controlling the transfer of the G-digit binary coded order to and from the associated gate means and;
    logic means responsive to both the M-digit ID means of a sending processor and the M-digit address of a receiving processor in said other means for generating gate signals to gate only the G-Digit binary coded orders from the processor containing the particular sending and receiving means to the correct one of the N−1 terminals specified by the M binary address of that other processor in the order means and as a function of the M digit binary address in the ID means.

2. The communication netword of claim 1 wherein: N=6 and
    the six processors are divided into two processors within each group directly connected by said multi-line paths.

3. The communiction network of claim 2 including a terminal means containing a portion of the multi-line paths between processors in different groups.

4. The communication network of claim 3 including:
    cabling means containing the paths between processors in the same group and portions of the paths between processors in different groups wherein certain of said paths in said cabling means and said terminal means are rotated 180° for coupling the paths to identically configured ports in different processors.

* * * * *